R. HOADLEY.
DRAFT-EQUALIZER.

No. 193,513. Patented July 24, 1877.

Witnesses
David Fey
Charles Arnston

Richard Hoadley.
by E. Thurlow
his Atty in fact

UNITED STATES PATENT OFFICE.

RICHARD HOADLEY, OF TOULON, ILLINOIS, ASSIGNOR OF ONE-HALF HIS RIGHT TO DAVIS LOWMAN, OF SAME PLACE.

IMPROVEMENT IN DRAFT-EQUALIZERS.

Specification forming part of Letters Patent No. 193,513, dated July 24, 1877; application filed November 10, 1876.

*To all whom it may concern:*

Be it known that I, RICHARD HOADLEY, of Toulon, in the county of Stark, in the State of Illinois, have invented an Improvement in Three-Horse Equalizers; and do hereby declare that the following is a full, clear, and exact description thereof, reference being had to the annexed drawings, making a part of this specification, in which like letters of reference refer to like parts, and in which—

Figure 1:
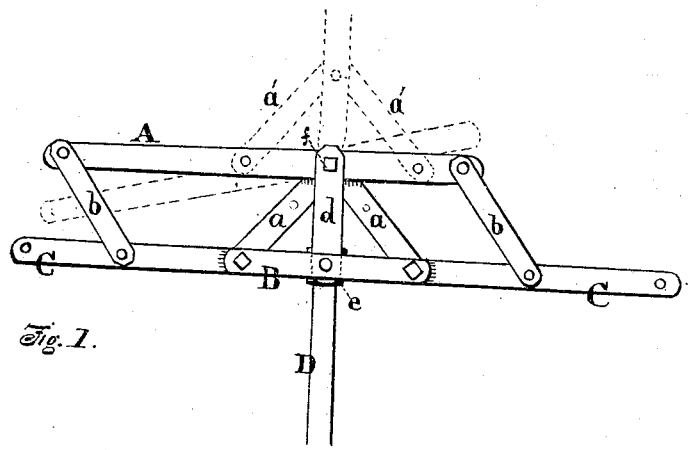
Figure 2:
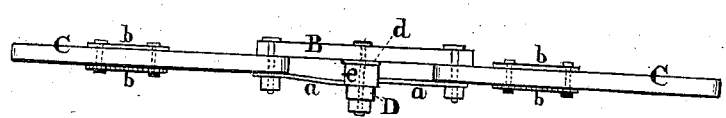
Figure 3:
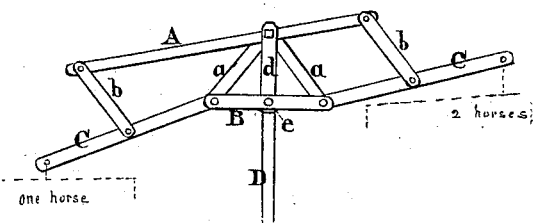

Figure 1 represents a superficial view, showing its use with the rear bar left to vibrate. Fig. 2 is a front elevation of same. Fig. 3 is a plan view, showing oscillation of the main bar A.

The object of this invention is to adapt a three-horse draft-equalizer for application indifferently to a reaping-machine, gang-plow, or vehicle, or any other object to be drawn with or without a tongue.

The braces are adapted to any form of equalizer for three animals, which have a main cross-bar linked to lateral bars, to which the draft is hitched, the latter being connected by a third bar in a line with them, and pivoted at the center to the tongue or a strap, connecting said third bar with the main bar.

I construct the equalizer as follows:

In the drawings, A is the main bar, which may be pivoted at any point, either at its center or on one side of same, to the tongue D, (removable, though, as hereinafter described.)

B is the central connecting-bar, pivoted at the center to the tongue D, (when the latter is used,) and permanently to a strap, or fore-and-aft brace, *d*, extending hence to the main bar A, or from its rear. Said bar B is also pivoted at either end to the respective side bars C C, each of unequal length, but of such extension in conjunction with the main bar A, as to balance the draft of two animals against the third on the other side of the line of draft. A block, *e*, interposed between the tongue D and said brace, compensates for the offset of the attached bars C C, pivoted to either end of said bar B.

The bars C C (here respectively pivoted in the center to one of the links or braces *b b*, respectively extending forward from either end of the main bar A) are of unequal lengths, one being about one-third shorter than its fellow. The said links *b b*, in this case, are parallel, and project obliquely forward to their respective pivots in said bars C.

The bar B is made rigid, to preserve the line of draft and direct course of the draft-animals by means of the braces *a a*, here shown jointly pivoted to the pin of the main bar A, and extending forward divergently, and each attached to one of the pivots at the junction of the lateral bars C with the bar B.

These braces may be attached to that part of the tongue in the rear of main bar A, to make said bar rigid, and allow the front bar B to vibrate on its center, or they may be attached to the common pivots of the bars B and C C, so as to converge forward on the tongue in front of said bar B.

The operation of this equalizer is as follows: The braces *a a* are removable from the bar A to the front bar B, to render either bar, on occasion, rigid with the tongue or the beam of a plow, &c. In using three horses on a plow, these V-braces *a a* must, to secure straight draft, be attached to the beam, and converge on the main bar A to make it rigid with said beam, but in a reaping-machine, &c., the V-braces *a a* are pivoted to the tongue and diverge forward in the same manner to the pivotal junctions of the forward central bar B, with the side bars C C for the same purpose, in each case the effect being to give the animals considerable room for backward and forward motion without interference with action of the devices, and whether drawing a tongueless implement or vehicle or one with a tongue.

What I claim as of my invention is—

1. A draft-equalizer having V shape or triangular braces *a a*, arranged to make the bar B rigid with tongue D, in combination with bars C C, connected to a back bar, A, by bars $b\ b$, substantially as and for the purposes set forth.

2. The combination of the removable and adjustable braces $a\ a$, having a pivotal connection with the junction-bolts of the bars B C, bolt $f$, main bar A, parallel bars $b\ b$, and strap $d$ or tongue D, constructed and adapted for the purposes substantially as shown and described.

In testimony that I claim the foregoing improvement in three-horse equalizers, I have hereunto set my hand this 3d day of November, 1876.

RICHARD HOADLEY.

Witnesses:
 H. W. WELLS,
 I. M. MORSE.